United States Patent
Shin et al.

(10) Patent No.: US 7,133,184 B2
(45) Date of Patent: Nov. 7, 2006

(54) VARIABLE GRATING DIFFRACTIVE LIGHT MODULATOR

(75) Inventors: Dong-Ho Shin, Seoul (KR); Jong-Hyeong Song, Kyunggi-do (KR); Yoon-Shik Hong, Kyunggi-do (KR); Jong-Su Yi, Kyunggi-do (JP); Yurlov Victor, Kyunggi-do (JP)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 38 days.

(21) Appl. No.: 10/952,249

(22) Filed: Sep. 28, 2004

(65) Prior Publication Data

US 2005/0270625 A1    Dec. 8, 2005

(30) Foreign Application Priority Data

Jun. 3, 2004    (KR) ................ 10-2004-0040387

(51) Int. Cl.
*G02B 26/00* (2006.01)

(52) U.S. Cl. ................ 359/291; 359/290; 359/292

(58) Field of Classification Search ........... 359/291, 359/290, 292, 295, 298, 294, 303, 318, 323
See application file for complete search history.

(56) References Cited

U.S. PATENT DOCUMENTS

| 5,311,360 A | 5/1994 | Bloom et al. |
| 5,949,570 A * | 9/1999 | Shiono et al. ............. 359/291 |
| 6,356,340 B1 * | 3/2002 | Spence .................... 355/53 |

FOREIGN PATENT DOCUMENTS

KR    2000-7014798    12/2000

* cited by examiner

*Primary Examiner*—A. Wise
*Assistant Examiner*—Brandi Thomas
(74) *Attorney, Agent, or Firm*—Christensen O'Connor Johnson Kindness PLLC

(57) ABSTRACT

Disclosed herein is a variable grating diffractive light modulator, which actuates lower reflecting plates of a lower reflecting array by a piezoelectric actuating method, and includes an upper reflecting array that is spaced apart from the lower reflecting array and attached to a lower surface of a substrate that is made of a light transmissive material and covers the lower reflecting array, so that the light modulator reflects incident light transmitted through the substrate and thereby produces diffractive light.

9 Claims, 14 Drawing Sheets

VARIABLE GRATING DIFFRACTIVE LIGHT MODULATOR

BACKGROUND OF THE INVENTION

1. Field of the Invention

The present invention relates generally to a variable grating diffractive light modulator, and more particularly, to a variable grating diffractive light modulator, which actuates lower reflecting plates of a lower reflecting array by a piezoelectric actuating method, and includes an upper reflecting array that is spaced apart from the lower reflecting array and attached to a lower surface of a substrate that is made of a light transmissive material and covers the lower reflecting array, so that the light modulator reflects incident light transmitted through the substrate and thereby produces diffractive light.

2. Description of the Related Art

Generally, an optical signal processing technology has advantages in that a great amount of data is quickly processed in a parallel manner unlike a conventional digital information processing technology in which it is impossible to process a great amount of data in real time. Studies have been conducted on the design and production of a binary phase only filter, an optical logic gate, a light amplifier, an image processing technique, an optical device, and a light modulator using a spatial light modulation theory. The spatial light modulator is applied to optical memory, optical display device, printer, optical interconnection, and hologram fields, and studies have been conducted to develop a display device employing it.

The spatial light modulator is embodied by a reflective deformable grating light modulator 10 as shown in FIG. 1. The modulator 10 is disclosed in U.S. Pat. No. 5,311,360 by Bloom et al. The modulator 10 includes a plurality of reflective deformable ribbons 18, which have reflective surface parts, are suspended on an upper part of a silicon substrate 16, and are spaced apart from each other at regular intervals. An insulating layer 11 is deposited on the silicon substrate 16. Subsequently, a sacrificial silicon dioxide film 12 and a low-stress silicon nitride film 14 are deposited. The nitride film 14 is patterned by the ribbons 18, and a portion of the silicon dioxide film 12 is etched, thereby maintaining the ribbons 18 on the oxide spacer layer 12 by a nitride frame 20. In order to modulate light having a single wavelength of $\lambda_o$, the modulator is designed so that the height difference of the ribbon 18 and oxide spacer 12 is equal to a multiple of $\lambda_o/2$.

Limited by a vertical distance between a reflective surface 22 of each ribbon 18 and a reflective surface of the substrate 16, a grating amplitude of the modulator 10 is controlled by applying voltage between the ribbon 18 (the reflective surface 22 of the ribbon 18 acting as a first electrode) and the substrate 16 (a conductive layer 24 formed on a lower side of the substrate 16 to act as a second electrode). In an undeformed state of the light modulator with no voltage application, the grating amplitude is $\lambda_o/2$ while a total round-trip path difference between light beams reflected from the ribbon and substrate is $\lambda_o$. Thus, a phase of reflected light is reinforced. Accordingly, in the undeformed state, the modulator 10 acts as a plane mirror when it reflects incident light. In FIG. 2, reference numeral 20 denotes the incident light reflected by the modulator 10 in the undeformed state.

When a proper voltage is applied between the ribbon 18 and substrate 16, the electrostatic force enables the ribbon 18 to move downward toward the surface of the substrate 16. At this time, the grating amplitude is changed to $\lambda_o/4$. The total round-trip path difference is a half of a wavelength, and light reflected from the deformed ribbon 18 and light reflected from the substrate 16 are subjected to destructive interference. The modulator diffracts incident light 26 using the interference. In FIG. 3, reference numerals 28 and 30 denote light beams diffracted in +/− diffractive modes ($D_{+1}$, $D_{-1}$) in the deformed state, respectively.

It has been proven that sticking of the ribbon 18 to the substrate 16 is a common problem of the light modulator 10 during a wet process applied to form a space under the ribbon 18 and during operation of the modulator 10. There are various methods of reducing the sticking: lyophilization, an OTS single layer treatment, use of a hard ribbon and/or a tightened nitride film gained by shortening the ribbon, a method of roughing or wrinkling one or both surfaces of two facing surfaces, a method of forming a reverse rail on the lower part of the ribbon, and a method of changing the chemical properties of the surfaces. In a solid-state sensor and actuator workshop held in June, 1994 at the Hilton Head Island in Scotland, prevention of sticking was reported, which is accomplished by reducing the contact area by forming a reverse rail on the lower part of a bridge and by employing a rough polysilicon layer as disclosed in "a process of finely treating the surface of a deformable grating light valve for high resolution display devices" suggested by Sandeyas, et al., and "a grating light valve for high resolution display devices", suggested by Apte et al.

Moreover, Apte et al. found that mechanical operation of the modulator 10 has a characteristic such that deformation of the ribbon 18 as a function of voltage forms hysteresis. The hysteresis is theoretically based on the fact that an electrostatic attractive force between the ribbon 18 and substrate 16 is a nonlinear function of the deformation, whereas hardness of the ribbon 18 is a substantially linear function of a resilient force by tension.

U.S. Pat. No. 5,311,360 by Bloom et al. discloses a latching feature which gives a modulator 10 advantages of an active matrix design without the need for active components. Additionally, Bloom et al. describes that this feature is valuable in low power applications where efficient use of available power is very important. However, Bloom et al. discloses the addition of small ridges below ribbons 18 to reduce a contact area, thereby reducing the sticking problem. However, since the substrate of the modulator 10 is used as an optical surface, a process of adding the small ridges to the surface is complicated in that a reflective element of the substrate 16 must be smooth so as to have high reflectance and must be positioned on a planar surface of the ribbon 18.

Typical display devices are formed in 2-D arrays of pixels. Discontinuous images formed by a plurality of pixels are integrated by user's eyes, thereby forming an aggregate image of pixels constituting a whole image. Unfortunately, prices of such a display device are high because the pixels are overlapped to form a complete array, so the production cost of each pixel is duplicated. The display device comprising pixels is exemplified by televisions or computer systems. Their pixels may be formed by an LCD device or a CRT device.

Accordingly, there is required a diffractive grating light valve capable of reducing or removing the sticking between the reflective element and the substrate without a complicated surface treatment adopted to reduce the sticking.

As well, a display device is required, which reduces the number of pixels to reduce production costs without reducing image quality while designing a system.

To satisfy the above requirements, a conventional improved technology is proposed in Korean Pat. Application No. 10-2000-7014798, entitled "method and device for modulating incident light beam to form 2-D image", by Silicon Light Machines Inc.

In the "method and device for modulating the incident light beam to form the 2-D image", the diffractive grating light valve includes a plurality of elongate elements each having a reflective surface. The elongate elements are arranged on an upper side of a substrate so that they are parallel to each other, have support ends, and their reflective surfaces lie in array (GLV array). The elongate elements form groups according to display elements. The groups alternately apply voltage to the substrate, resulting in deformation of the elements. The almost planar center portion of each deformed elongate element is parallel to and spaced from the center portion of the undeformed element by a predetermined distance which is set to ⅓–¼ of the distance between the undeformed reflective surface and the substrate. Thus, the deformed elongate elements are prevented from coming into contact with the surface of the substrate. Sticking between the elongate elements and the substrate is prevented by preventing contact between the elements and substrate. Additionally, the predetermined distance between each deformed elongate element and the substrate is limited so as to prevent hysteresis causing deformation of the elongate elements.

FIG. 4 is a side sectional view of an elongate element 100 of a GLV in an undeformed state according to a conventional improved technology. In FIG. 4, the elongate element 100 is suspended above a surface of a substrate (including constitution layers) by ends thereof. In FIG. 5, reference numeral 102 denotes an air space.

FIG. 5 is a side sectional view of a deformed elongate element 100 of the GLV. FIG. 5 shows that the deformed elongate element 100 is maintained in the suspended state thereof to be spaced from the surface of the substrate adjacent therebeneath. This is in contrast to the conventional modulator of FIGS. 1 to 3. Contact between the elongate element 100 and the surface of the substrate is prevented, thereby avoiding the disadvantages of conventional modulators. However, the elongate element 100 is apt to sag in the deformed state. The reason is that the elongate element 100 is uniformly subjected to an electrostatic attractive force acting toward the substrate in directions perpendicular to a longitudinal direction thereof, whereas tension of the elongate element 100 acts along the length of the elongate element 100. Therefore, the reflective surface of the elongate element is not planar but curvilinear.

However, the center part 102 of the elongate element 100 (FIG. 8) is almost planar, making the contrast ratio of diffracted light, gained by only the center part 102 of the elongate element 100, desirable. The substantially planar center part 102 has a length that is ⅓ of a distance between post holes 110. Hence, when the distance between the post holes 110 is 75 µm, the almost planar center part 102 is about 25 µm long.

FIG. 6 is a front view of the display element 200 in which the deformed elongate elements 100 are alternately arranged. FIG. 6 is a view taken in the direction of the arrows along the line B–B' of FIG. 5. The elongate ribbons 100 which are not removed are maintained at desired positions by an applied bias voltage. Deformation of the moving elongate ribbons 100 is achieved by alternate applications of operation voltages through the conductive layer 106 to the elongate elements 100. A vertical distance ($d_1$) is almost constant to the almost planar center part 102 (FIG. 5), thereby limiting the grating amplitude of the GLV. The grating amplitude ($d_1$) may be controlled by adjusting an operation voltage on the operated elongate elements 100. This results in precision tuning of the GLV in an optimum contrast ratio.

As for diffractive incident light having a single wavelength ($\lambda_1$), it is preferable that the GLV has a grating width ($d_1$) that is ¼ ($\lambda_o/4$) of the wavelength of incident light to assure a maximum contrast ratio in an image to be displayed. However, the grating width ($d_1$) requires only a round trip distance that is the same as the sum of a half of the wavelength ($\lambda_1$) and the whole number of the wavelength ($\lambda_1$) (i.e. $d_1 = \lambda_1/4, 3\lambda_1/4, 5\lambda_1/4, \ldots, N\lambda_1/2 + \lambda_1/4$).

Referring to FIG. 6, the lower side of each elongate element 100 is spaced upward from the substrate by a distance of $d_2$. Accordingly, the elongate elements 100 do not come into contact with the substrate during operation of the GLV. This results in avoidance of the sticking problems between the reflective ribbons and the substrate occurring in conventional modulators.

However, the conventional technology inevitably requires a gap between micromirrors to actuate the micromirrors with a ribbon shape. As the gap increases, a fill factor is reduced with respective to the same ribbon width. Hence, a maximum quantity of light which is diffracted to 0th or ±1 st order becomes small, thus reducing a dynamic range of the light modulator.

According to the conventional technology, the light modulator has various pitches, according to adapted areas, including printing or displaying areas. The light modulator must minimize the gap between the micromirrors under a given pitch. In the case of a light modulator having a small pitch, a high fill factor is required to assure a sufficient modulation dynamic range, thereby a small gap is required. However, it is very difficult to form a small gap. Further, as the gap is reduced, the capacity of the device is deteriorated.

Further, the conventional technology is problematic in that the diffraction efficiency is lowered, and the uniformity of the output light of all pixels is thus lowered, when the actuating distance of three or four micromirrors provided in one pixel to be simultaneously actuated is not accurately regulated.

SUMMARY OF THE INVENTION

Accordingly, the present invention has been made keeping in mind the above problems occurring in the prior art, and an object of the present invention is to provide a variable grating diffractive light modulator, which actuates lower reflecting plates of a lower reflecting array by a piezoelectric actuating method, and includes an upper reflecting array that is spaced apart from the lower reflecting array and attached to a lower surface of a substrate that is made of a light transmissive material and covers the lower reflecting array, so that the light modulator reflects incident light transmitted through the substrate and thereby produces diffractive light.

In order to accomplish the above object, the present invention provides a variable grating diffractive light modulator, including a light transmissive plate to transmit light; a plurality of first reflecting plates attached to a lower surface of the light transmissive plate to be arranged in a row, each of the first reflecting plates having a first reflective surface on a light transmissive plate contact surface thereof; a plurality of second reflecting plates provided under the first reflecting plates to be spaced apart from the first reflecting plates at a predetermined interval while being arranged in a row, each of the second reflecting plates having a second reflective surface to reflect incident light falling downwardly; and a plurality of actuating units attached to lower surfaces of the second reflecting plates, and moving between a first position wherein the first reflective surfaces and the second reflective surfaces form a plane mirror, and a second position wherein the first and second reflective surfaces diffract the incident light.

BRIEF DESCRIPTION OF THE DRAWINGS

The above and other objects, features and other advantages of the present invention will be more clearly understood from the following detailed description taken in conjunction with the accompanying drawings, in which:

FIGS. 17a to 17c are perspective views to show three thin-film piezoelectric micromirror arrays used in the variable grating diffractive light modulators of FIGS. 13, 14a, 15, and 16a.

DESCRIPTION OF THE PREFERRED EMBODIMENTS

Hereinafter, embodiments of the present invention will be described in detail with reference to the attached drawings.

Figure 1:
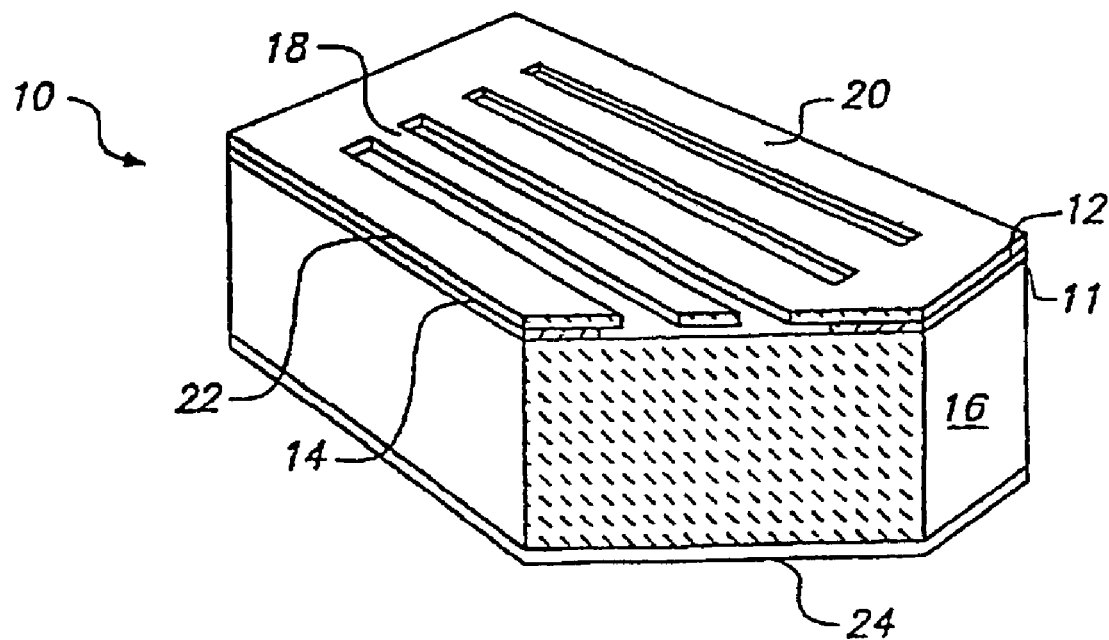
FIG. 1 illustrates a grating light modulator adopting an electrostatic manner according to a conventional technology.
Figure 2:
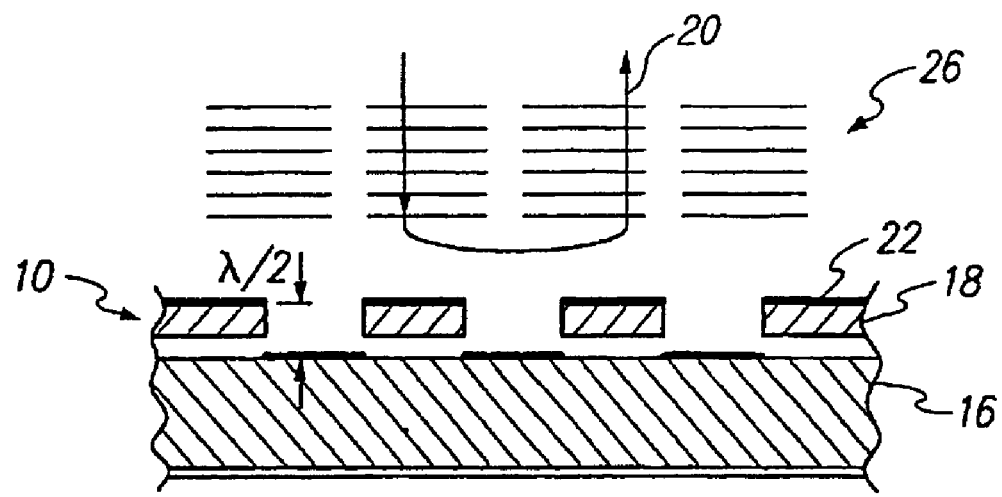
FIG. 2 illustrates reflection of incident light by the grating light modulator adopting the electrostatic manner according to the conventional technology in an undeformed state.
Figure 3:
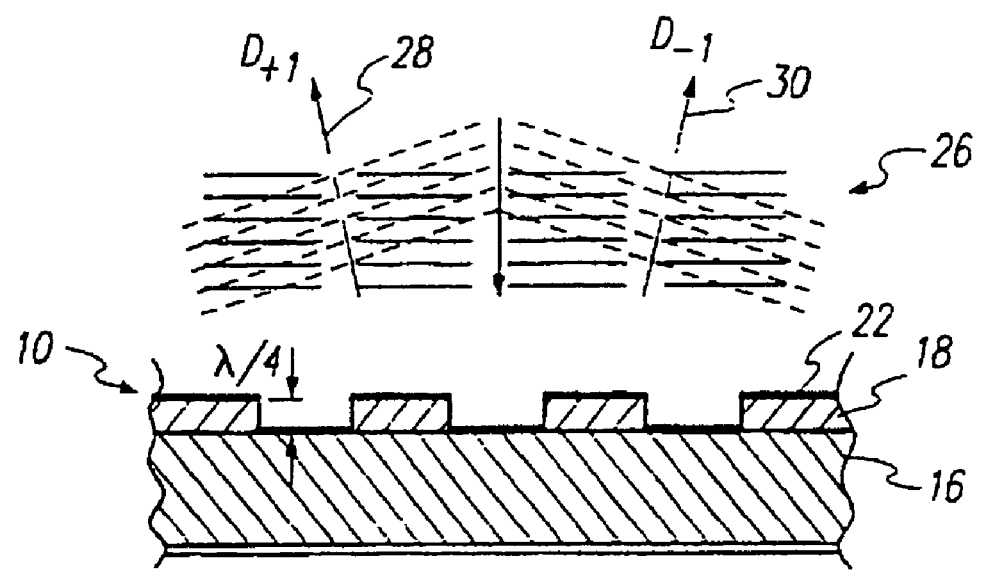
FIG. 3 illustrates diffraction of incident light by the grating light modulator according to the conventional technology in a deformed state caused by an electrostatic force.
Figure 4:
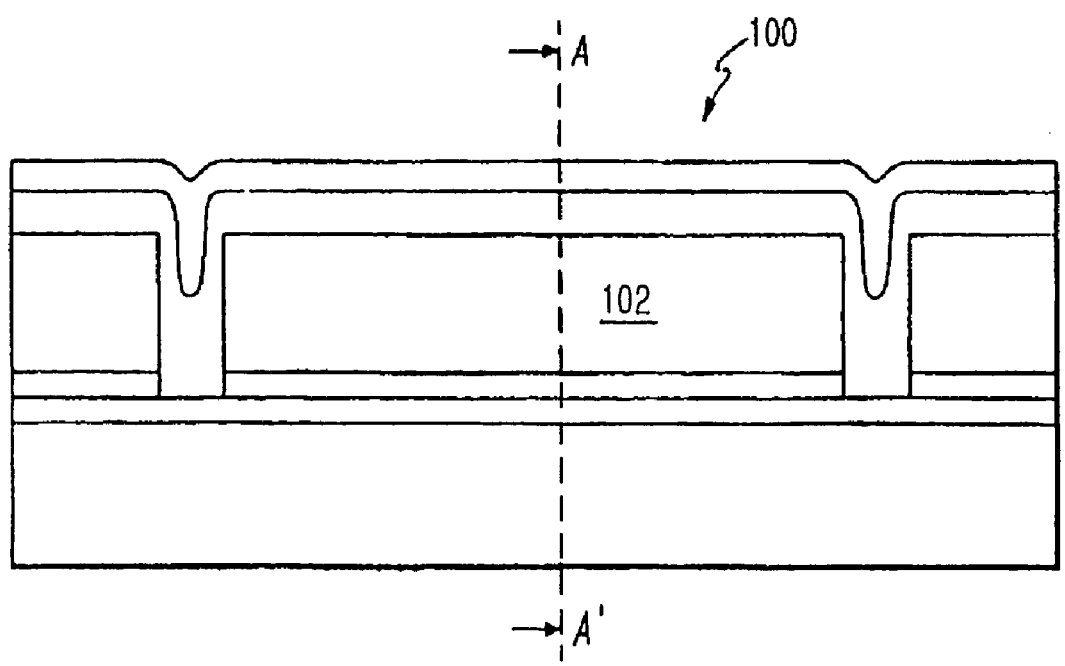
FIG. 4 is a side sectional view of an elongate element of a grating light valve (GLV), according to an improved conventional technology, in an undeformed state.
Figure 5:
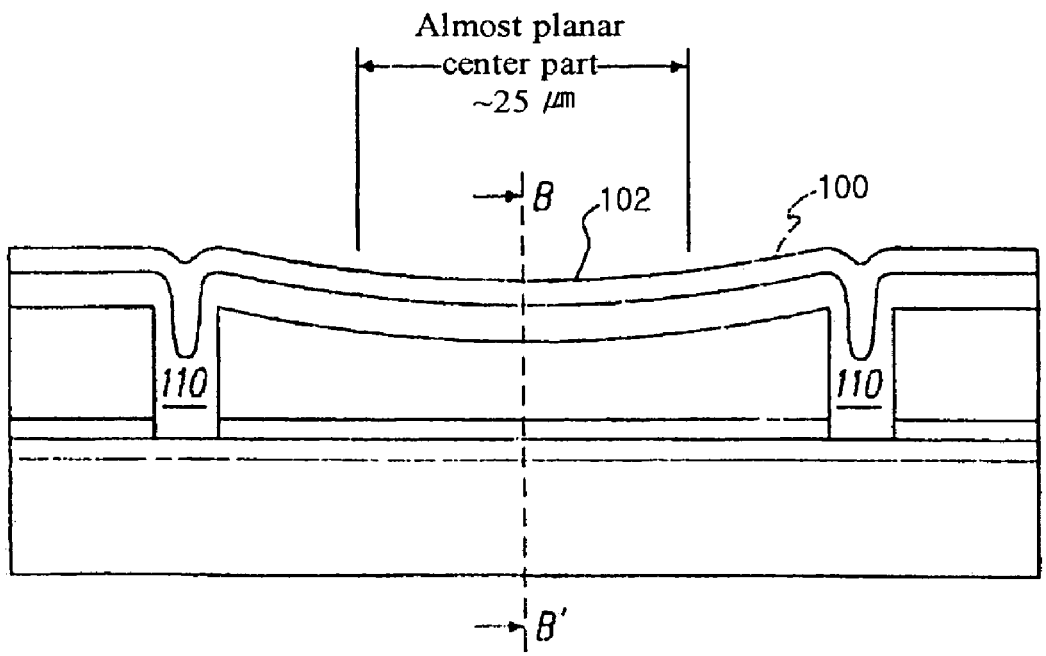
FIG. 5 is a side sectional view of the elongate element of the GLV according to the conventional improved technology, which is deformed by an electrostatic force.
Figure 6:
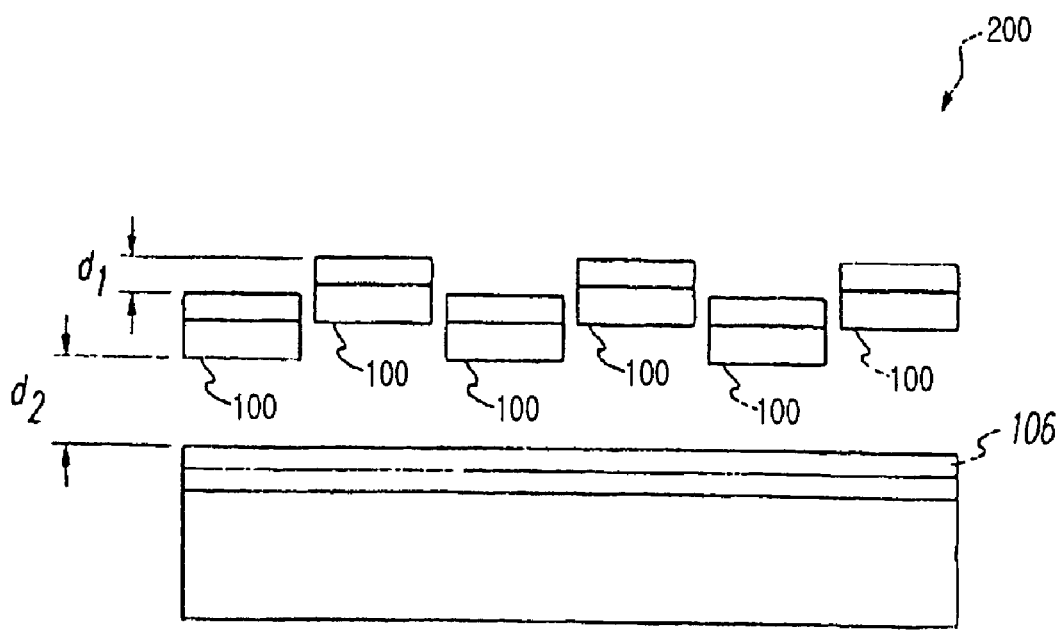
FIG. 6 is a front view of a display element of a GLV including six elongate elements alternately arranged, which diffracts incident light in a deformed state caused by an electrostatic force according to a conventional improved technology.
Figure 7:
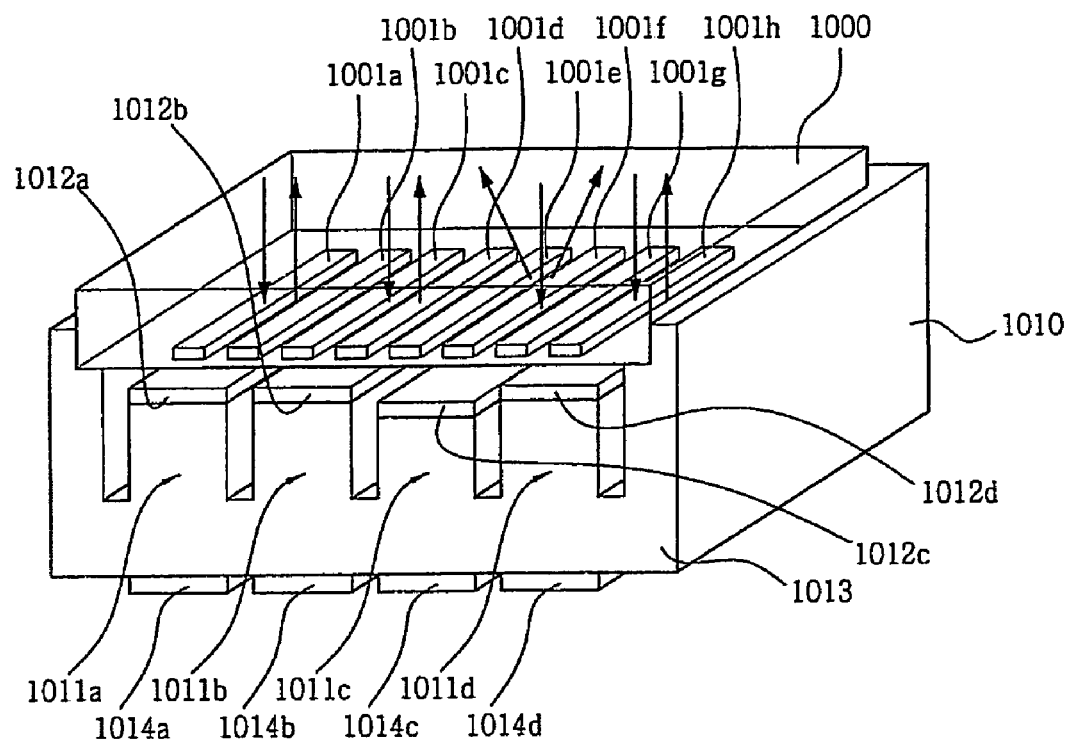
FIG. 7 is a perspective view of a variable grating diffractive light modulator, according to the first embodiment of the present invention.

FIG. 7 is a perspective view of a variable grating diffractive light modulator, according to the first embodiment of the present invention.

Referring to the drawing, the variable grating diffractive light modulator according to the first embodiment of this invention includes a glass substrate 1000 and a moving part 1010.

The glass substrate 1000 is made of a light transmissive material to transmit incident light, thus transmitting incident light entering an upper side of the glass substrate 1000. Further, a plurality of reflecting plates 1001a to 1001h is arranged on a surface of the glass substrate 1000 facing the moving part 1010, thus providing an upper reflecting array.

The moving part 1010 includes a piezoelectric material layer 1013 which has a plurality of bends with a shape of a rectangular bar. Upper electrode layers 1012a to 1012d are placed on upper portions of the bends of the piezoelectric material layer 1013, and lower electrode layers are placed on lower portions of the bends. In this case, the upper electrode layers 1012a to 1012d serve as lower reflecting plates, and provide a lower reflecting array.

Of the upper electrode layers 1012a to 1012d and the lower electrode layers 1014a to 1014d of the moving part 1010, when voltage is applied to an electrode layer to be actuated, for example, an upper electrode layer 1012b, an associated bend of the piezoelectric material layer 1013 vertically contracts or expands, thus generating an actuating force. Thereby, the upper electrode layer 1012b to which the voltage is applied moves up and down, so that a height difference which is equal to a multiple of $\lambda_0/4$ is formed between the upper electrode layer 1012b and the corresponding upper reflecting plates 1001c and 1001d of the glass substrate 1000. Therefore, diffractive light is produced from the incident light entering the upper portion of the glass substrate 1000.

That is, the height difference which is equal to a multiple of $\lambda_0/4$ is formed between the upper reflecting plates 1001a to 1001h and the corresponding lower reflecting plates 1012a to 1012d, thus leading to diffractive light.

Figure 8A:
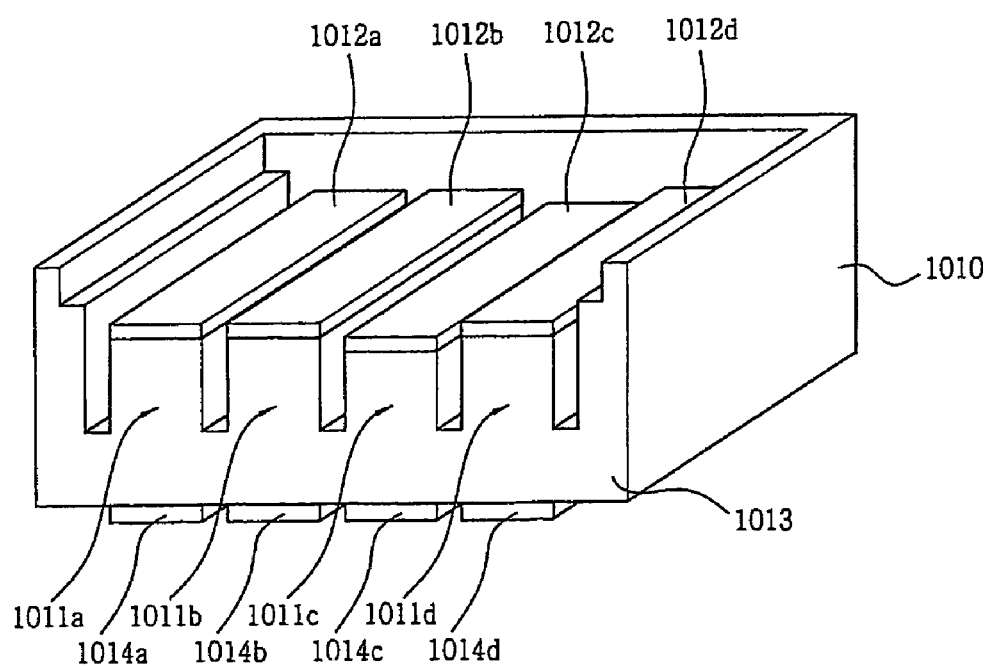
FIGS. 8a and 8b are perspective views to show specific parts of the variable grating diffractive light modulator of FIG. 7.
Figure 8B:
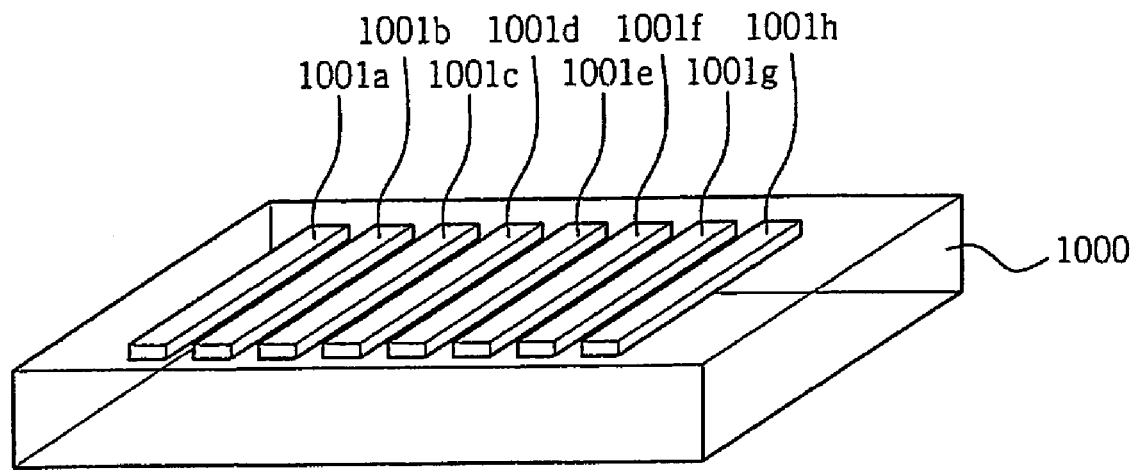

FIGS. 8a and 8b are perspective views of specific parts of the variable grating diffractive light modulator of FIG. 7, according to the first embodiment of this invention.

As shown in FIG. 8a, the moving part 1010 is provided with the upper electrode layers 1012a to 1012d that function as both reflective surfaces and upper electrodes. The moving part 1010 also includes the piezoelectric material layer 1013 which contracts or expands in response to an applied voltage, and the lower electrode layers 1014a to 1014d which function as lower electrodes.

The upper electrode layers 1012a to 1012d serve as reflective surfaces, thus reflecting incident light falling through the glass substrate 1000. At this time, the variance in the height difference between the upper reflecting plates 1001a to 1001d and the upper electrode layers 1012a to 1012d is caused by the movement of the upper electrode layers 1012a to 1012 due to the contraction or expansion of the piezoelectric material layer 1013.

Referring to FIG. 8b, the glass substrate 1000 is made of a light transmissive material to transmit incident light. The reflecting plates 1001a to 1001h are arranged on the surface of the glass substrate 1000 while being spaced apart from each other at regular intervals, thus providing the upper reflecting array. In FIG. 8b, the reflecting plates 1001a to 1001h are arranged in a longitudinal direction of the upper electrode layers 1012a to 1012d of the moving part 1010. However, without being limited to this embodiment, the reflecting plates 1001a to 1001h may be arranged perpendicular to the upper electrode layers 1012a to 1012d of the moving part 1010.

Figure 9A:
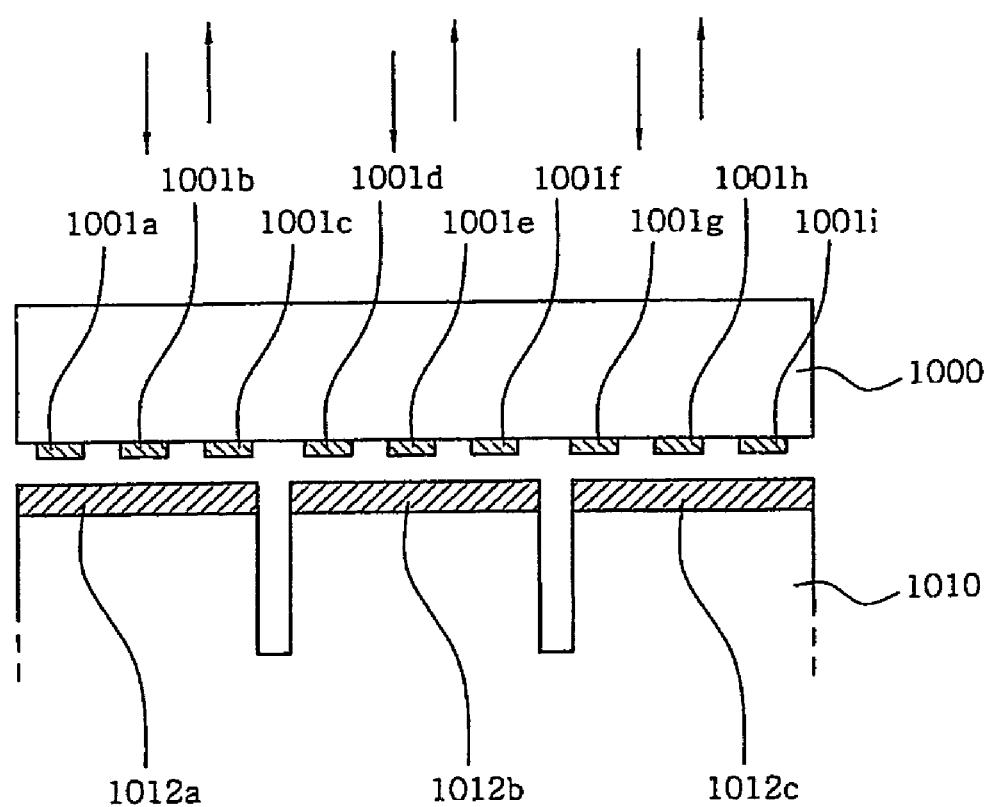
FIGS. 9a and 9b illustrate the formation of diffractive light in the variable grating diffractive light modulator according to the first embodiment of this invention.
Figure 9B:
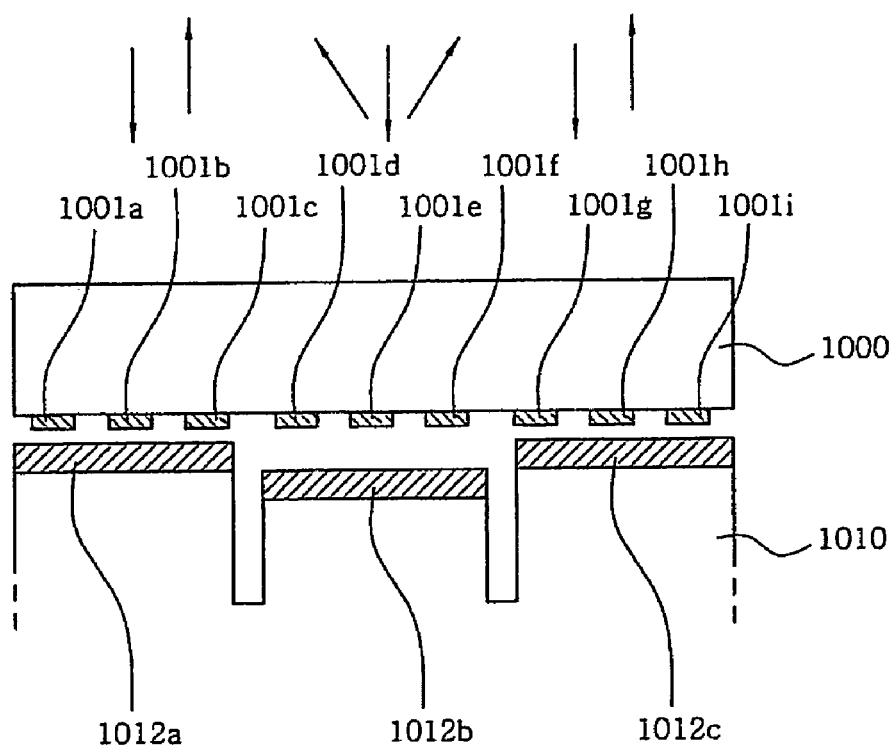

FIGS. 9a and 9b are views to illustrate the formation of diffractive light in the variable grating diffractive light modulator, according to the first embodiment of the present invention (FIGS. 9a and 9b show a different arrangement from that of FIGS. 7 to 8b)

Referring to FIG. 9a, the upper reflecting plates 1001a to 1001i and the lower reflecting plates 1012a to 1012c referred to as the upper electrode layers do not form a height difference which is equal to a multiple of $\lambda_0/4$ to produce diffractive light. Thereby, all incident light falling on the glass substrate 1000 is reflected.

However, as shown in FIG. 9b, the piezoelectric material layer 1013 contracts, so that the upper electrode layer 1012b moves downward, thereby a height difference corresponding to a multiple of $\lambda_0/4$ is formed between the upper electrode layer 1012b and the associated upper reflecting plates 1001d, 1001e, and 1001f. Therefore, incident light falling through the upper portion of the glass substrate 1000 is diffracted to produce diffractive light.

Figure 10A:
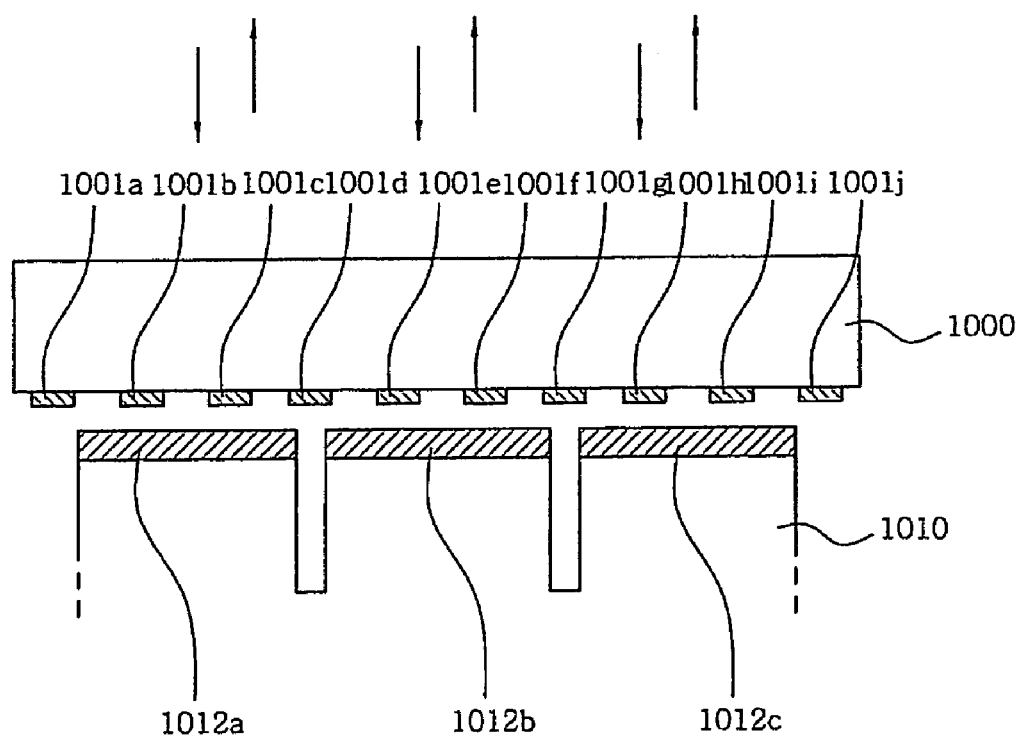
FIGS. 10a and 10b are views to show an array of upper reflecting plates of the variable grating diffractive light modulator, according to the first embodiment of this invention.
Figure 10B:
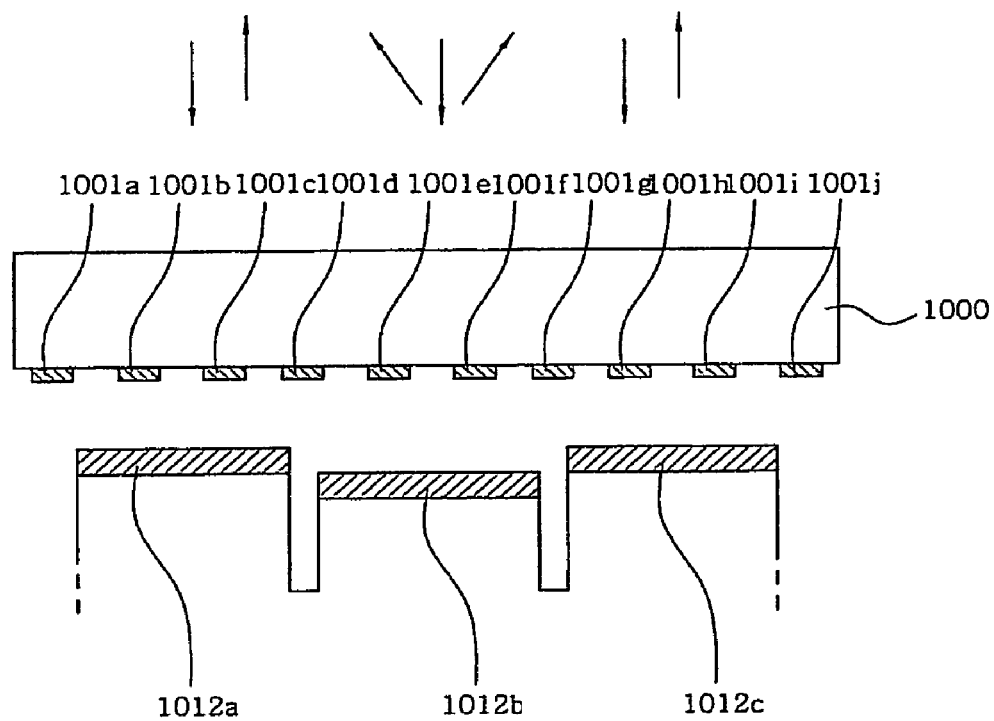

FIGS. 10a and 10b are views to show another configuration of the upper reflecting array of the variable grating diffractive light modulator, according to the first embodiment of this invention.

Referring to FIGS. 10a and 10b, reflecting plates 1001d and 1001 g of the upper reflecting plates 1001a to 1001i are positioned at gaps defined between neighboring bends, unlike the upper reflecting array shown in FIGS. 9a and 9b. Such a configuration prevents deterioration of efficiency due to the gaps between the bends of the moving part 1010.

Figure 11:
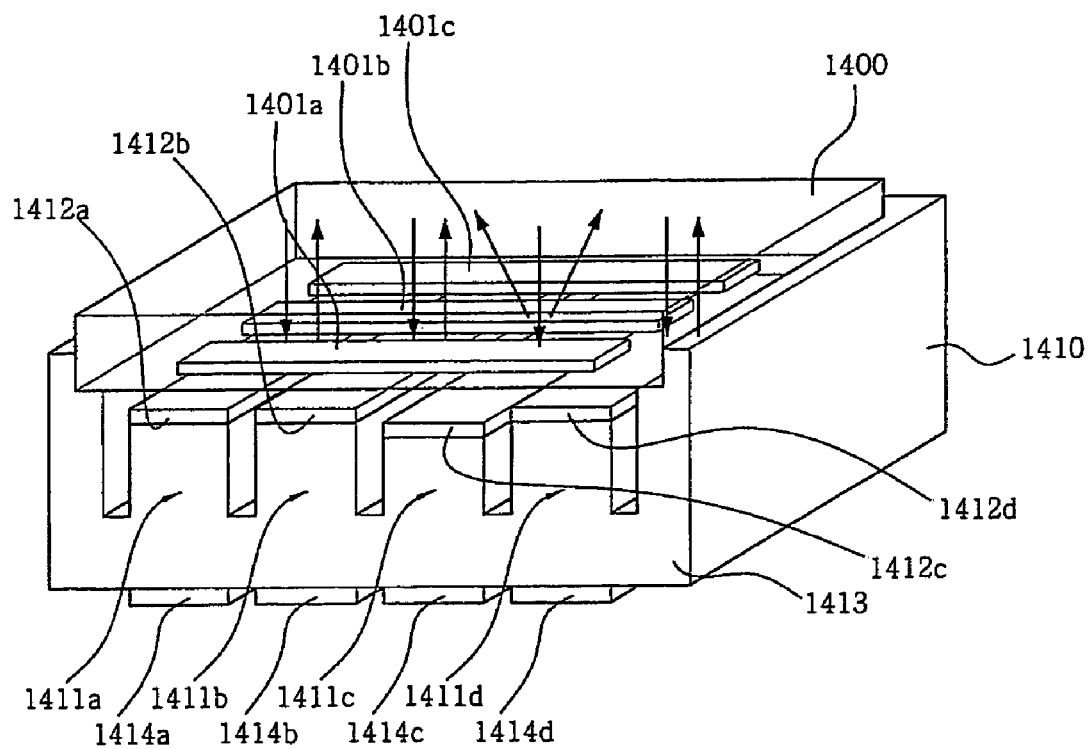
FIG. 11 is a perspective view of a variable grating diffractive light modulator, according to the second embodiment of the present invention.

FIG. 11 is a perspective view of a variable grating diffractive light modulator, according to the second embodiment of the present invention.

Referring to the drawing, the variable grating diffractive light modulator according to the second embodiment of this invention includes a glass substrate 1400 and a moving part 1410. The variable grating diffractive light modulator of the second embodiment is different from that of the first embodiment in that a plurality of upper reflecting plates 1401a to 1401c is arranged perpendicular to a longitudinal direction of upper electrode layers 1412a to 1412d.

The glass substrate 1400 is made of a light transmissive material to transmit incident light, thus transmitting incident light falling on the glass substrate 1400. A plurality of reflecting plates 1401a to 1401c is arranged on a lower surface of the glass substrate 1400 facing the moving part 1410 to be spaced apart from each other, thus providing an upper reflecting array.

The moving part 1410 includes a piezoelectric material layer 1413 which has a plurality of bends with a shape of a rectangular bar. Upper electrode layers 1412a to 1412d are placed on upper portions of the bends of the piezoelectric material layer 1413, and lower electrode layers 1414a to 1414d are placed on lower portions of the bends. In this case, the upper electrode layers 1412a to 1412d serve as lower reflective surfaces.

When voltage is applied to a desired upper electrode layer 1412a to 1412d of the moving part 1410, an associated bend of the piezoelectric material layer 1413 vertically contracts or expands, thus generating an actuating force. Thereby, the associated upper electrode layer 1412a, 1412b, 1412c, 1412d moves downward, so that a height difference corresponding to a multiple of $\lambda_0/4$ is formed between the upper electrode layer 1412a, 1412b, 1412c, 1412d and the corresponding upper reflecting plates 1401a to 1401c.

In this case, incident light entering an upper portion of the glass substrate 1400 is diffracted by the height difference corresponding to a multiple of $\lambda_0/4$ formed between the upper reflecting plates 1401a to 1401c and the corresponding lower reflective surfaces 1412a to 1412d, thus producing diffractive light.

Figure 12A:
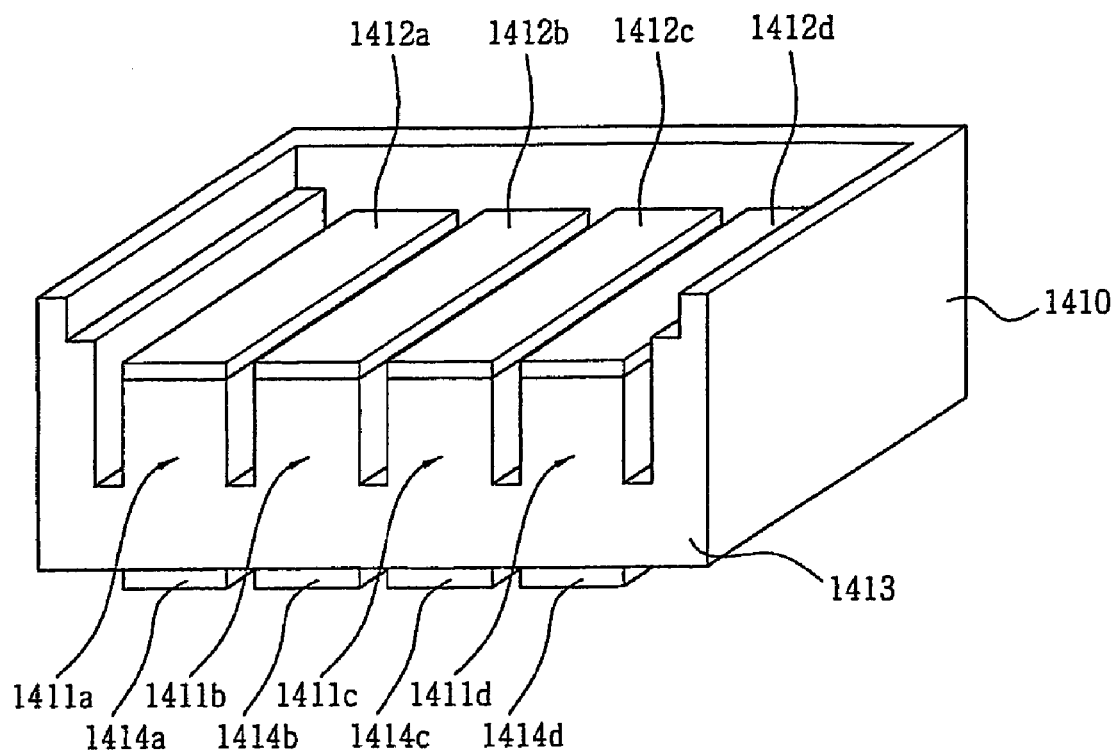
FIGS. 12a and 12b are perspective views to show specific parts of the variable grating diffractive light modulator of FIG. 11.
Figure 12B:
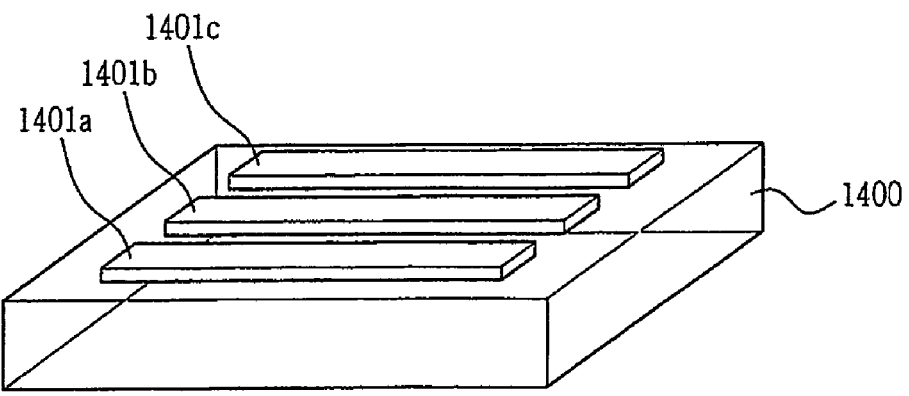

FIGS. 12a and 12b are perspective views of specific parts of the variable grating diffractive light modulator of FIG. 11, according to the second embodiment of the present invention.

Referring to FIG. 12a, the moving part 1410 is provided with the upper electrode layers 1412a to 1412d that function as reflective surfaces and upper electrodes. The moving part 1410 also includes the piezoelectric material layer 1413 which contracts or expands in response to an applied voltage, and the lower electrode layers 1414a to 1414d which function as lower electrodes. At this time, the variance in the height difference between the upper reflecting plates 1401a to 1401c and the upper electrode layers 1412a to 1412d is caused by the movement of the upper electrode layers 1412a to 1412d due to the contraction or expansion of the piezoelectric material layer 1413.

Referring to FIG. 12b, the glass substrate 1400 is made of a light transmissive material to transmit incident light. The plurality of reflecting plates 1401a to 1401c is arranged on a surface of the glass substrate 1400 to be spaced apart from each other at regular intervals. In FIG. 12b, the reflecting plates 1401a to 1401c are arranged perpendicular to the longitudinal direction of the upper electrode layers 1412a to 1412d of the piezoelectric material layer 1413.

Figure 13:
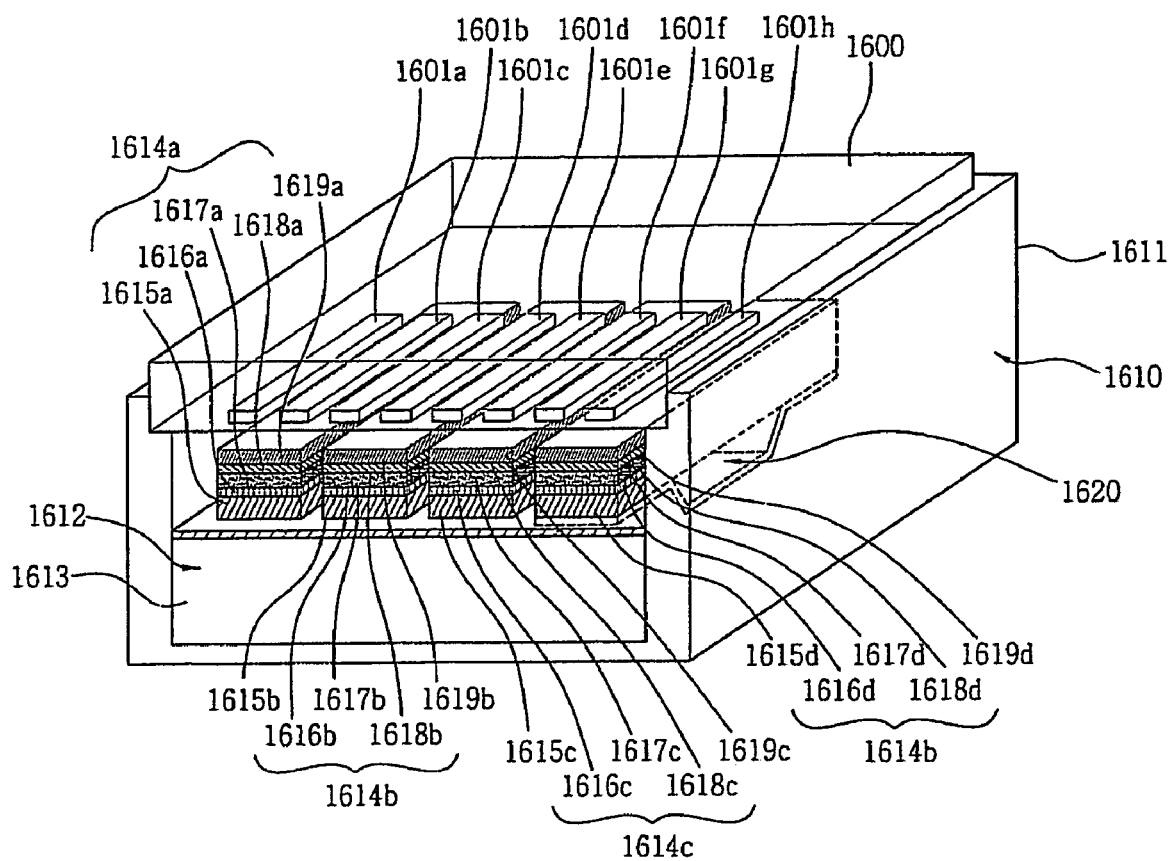
FIG. 13 is a perspective view of a variable grating diffractive light modulator, according to the third embodiment of the present invention.

FIG. 13 is a perspective view of a variable grating diffractive light modulator, according to the third embodiment of the present invention.

Referring to the drawing, the variable grating diffractive light modulator according to the third embodiment of this invention includes a glass substrate 1600 and a moving part 1610.

The glass substrate 1600 is made of a light transmissive material to transmit incident light, thus transmitting incident light falling on the glass substrate 1600. A plurality of reflecting plates 1601a to 1601h is arranged on a surface of the glass substrate 1600 facing the moving part 1610 to be spaced apart from each other.

The moving part 1610 includes a housing 1611 and a thin-film piezoelectric micromirror array 1612 seated in the housing 1611.

The thin-film piezoelectric micromirror array 1612 is formed by arraying thin-film piezoelectric micromirrors 1614a to 1614d with a ribbon shape. Each of the thin-film piezoelectric micromirrors 1614a to 1614d includes a lower supporter 1615a, 1615b, 1615c, 1615d, a lower electrode layer 1616a, 1616b, 1616c, 1616d, a piezoelectric layer 1617a, 1617b, 1617c, 1617d, an upper electrode layer 1618a, 1618b, 1618c, 1618d, and a reflective surface 1619a, 1619b, 1619c, 1619d.

In each of the thin-film piezoelectric micromirrors 1614a to 1614d, when voltage is applied to the upper electrode layers 1618a to 1618d and the lower electrode layers 1616a to 1616d, central portions located at a recess 1620 move up and down due to the contraction and expansion of the piezoelectric layers 1617a to 1617d.

Thus, incident light falling on the glass substrate 1600 produces diffractive light due to a height difference corresponding to a multiple of $\lambda_0/4$ formed between the upper reflecting plates 1601a to 1601h and the lower reflective surfaces 1619a to 1619d.

Figure 14A:
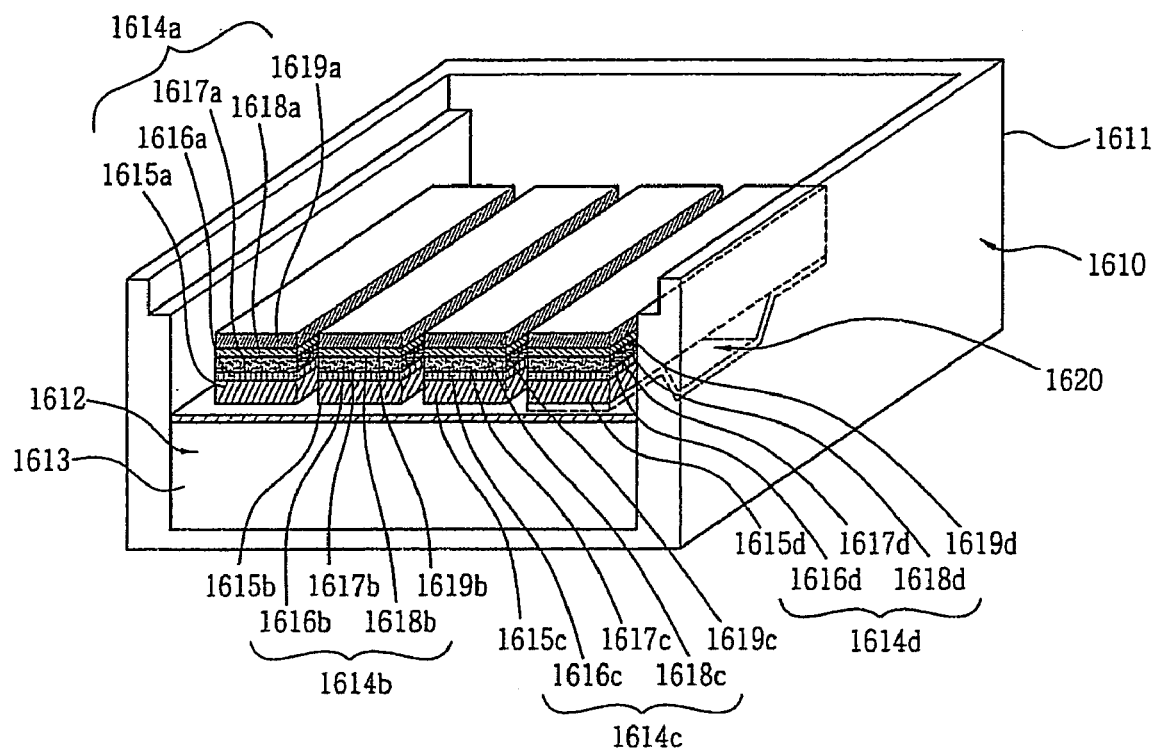
FIGS. 14a and 14b are perspective views to show specific parts of the variable grating diffractive light modulator of FIG. 13.
Figure 14B:
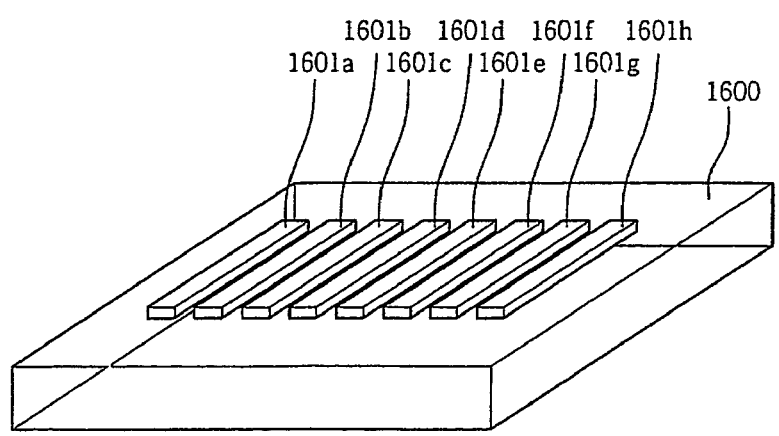

FIGS. 14a and 14b are perspective views to show specific parts of the variable grating diffractive light modulator of FIG. 13, according to the third embodiment of the present invention.

As shown in FIG. 14a, the moving part 1610 includes the housing 1611 and the thin-film piezoelectric micromirror array 1612 seated in the housing 1611. The thin-film piezoelectric micromirror array 1612 has the thin-film piezoelectric micromirrors 1614a to 1614d with the ribbon shape.

Each of the thin-film piezoelectric micromirrors 1614a to 1614d are provided with the lower supporter 1615a, 1615b, 1615c, 1615d, the lower electrode layer 1616a, 1616b, 1616c, 1616d, the piezoelectric layer 1617a, 1617b, 1617c, 1617d, the upper electrode layer 1618a, 1618b, 1618c, 1618d, and the reflective surface 1619a, 1619b, 1619c, 1619d.

Such thin-film piezoelectric micromirrors 1614a to 1614d are operated as follows. That is, when voltage is applied to the upper electrode layers 1618a to 1618d and the lower electrode layers 1616a to 1616d, the central portions located at the recess 1620 move up and down due to the contraction and expansion of the piezoelectric layers 1617a to 1617d.

Referring to FIG. 14b, the glass substrate 1600 is made of a light transmissive material to transmit incident light, with the plurality of reflecting plates 1601a to 1601h arranged on a surface of the glass substrate 1600 to be spaced apart from each other at regular intervals. According to this embodiment, the reflecting plates 1601a to 1601h are arranged in a longitudinal direction of the thin-film piezoelectric micromirrors 1614a to 1614d. However, the reflecting plates 1601a to 1601h may be arranged perpendicular to the longitudinal direction of the thin-film piezoelectric micromirrors 1614a to 1614d.

Figure 15:
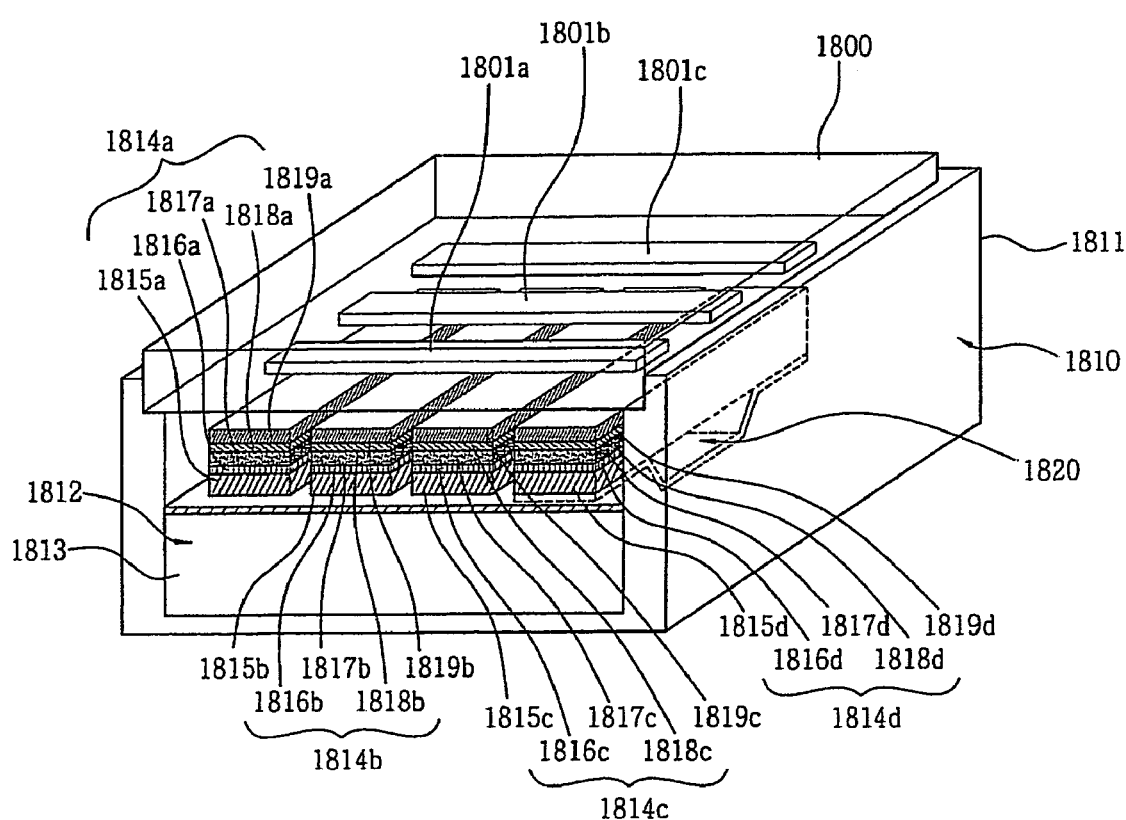
FIG. 15 is a perspective view of a variable grating diffractive light modulator, according to the fourth embodiment of the present invention.

FIG. 15 is a perspective view of a variable grating diffractive light modulator, according to the fourth embodiment of the present invention.

Referring to the drawing, the variable grating diffractive light modulator according to the fourth embodiment of this invention includes a glass substrate 1800 and a moving part 1810. The glass substrate 1800 has reflecting plates 1801a to 1801c which are arranged perpendicular to the longitudinal direction of thin-film piezoelectric micromirrors 1814a to 1814d. The moving part 1810 functions to provide a desired height difference to the reflecting plates 1801a to 1801c of the glass substrate 1800.

The glass substrate 1800 is made of a light transmissive material to transmit incident light. A plurality of reflecting plates 1801a to 1801c is provided on a surface of the glass substrate 1800 facing the moving part 1810 to be spaced apart from each other. The reflecting plates 1801a to 1801c are perpendicular to the longitudinal direction of the thin-film piezoelectric micromirrors 1814a to 1814d of the moving part 1810, thereby diffractive light is generated from incident beam.

Further, the moving part 1810 includes a housing 1811 and a thin-film piezoelectric micromirror array 1812 seated in the housing 1811.

The thin-film piezoelectric micromirror array 1812 is formed by arraying thin-film piezoelectric micromirrors 1814a to 1814d with a ribbon shape. Each of the thin-film piezoelectric micromirrors 1814a to 1814d includes a lower supporter 1815a, 1815b, 1815c, 1815d, a lower electrode layer 1816a, 1816b, 1816c, 1816d, a piezoelectric layer 1817a, 1817b, 1817c, 1817d, an upper electrode layer 1818a, 1818b, 1818c, 1818d, and a reflective surface 1819a, 1819b, 1819c, 1819d.

In each of the thin-film piezoelectric micromirrors 1814a to 1814d, when voltage is applied to the upper electrode layers 1818a to 1818d and the lower electrode layers 1816a to 1816d, central portions located at a recess 1820 move up and down due to the contraction and expansion of the piezoelectric layers 1817a to 1817d.

Thus, incident light falling on the glass substrate 1800 produces diffractive light by a height difference corresponding to a multiple of $\lambda_0/4$ formed between the upper reflecting plates 1801a to 1801c and the lower reflective surfaces 1819a to 1819d.

Figure 16A:
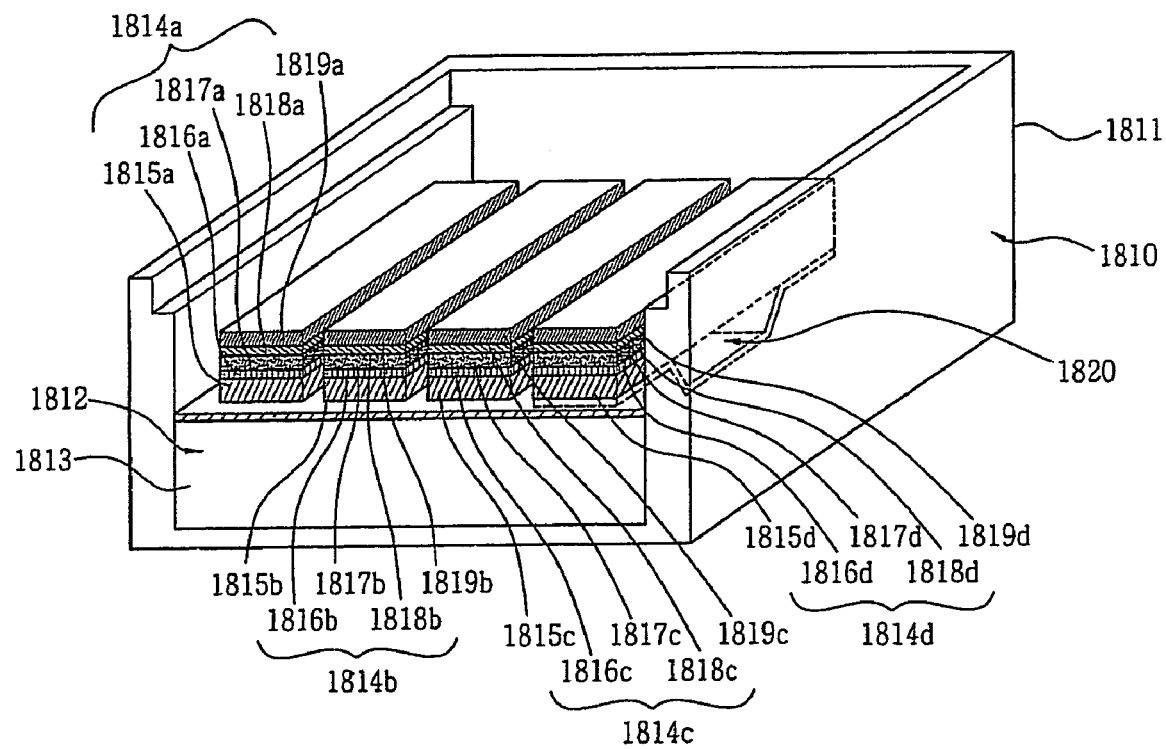
FIGS. 16a and 16b are perspective views to show specific parts of the variable grating diffractive light modulator of FIG. 15.
Figure 16B:
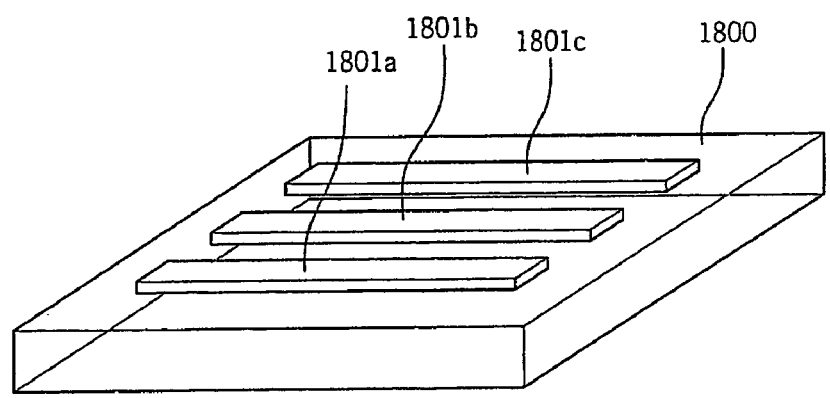

FIGS. 16a and 16b are perspective views to show specific parts of the variable grating diffractive light modulator of FIG. 15, according to the fourth embodiment of the present invention.

As shown in FIG. 16a, the moving part 1810 includes the housing 1811 and the thin-film piezoelectric micromirror array 1812 seated in the housing 1811. The thin-film piezoelectric micromirror array 1812 has the thin-film piezoelectric micromirrors 1814a to 1814d with the ribbon shape.

Each of the thin-film piezoelectric micromirrors 1814a to 1814d are provided with the lower supporter 1815a, 1815b, 1815c, 1815d, the lower electrode layer 1816a, 1816b, 1816c, 1816d, the piezoelectric layer 1817a, 1817b, 1817c, 1817d, the upper electrode layer 1818a, 1818b, 1818c, 1818d, and the reflective surface 1819a, 1819b, 1819c, 1819d.

Such thin-film piezoelectric micromirrors 1814a to 1814d are operated as follows. That is, when voltage is applied to the upper electrode layers 1818a to 1818d and the lower electrode layers 1816a to 1816d, the central portions located at the recess 1620 move up and down due to the contraction and expansion of the piezoelectric layers 1817a to 1817d.

Referring to FIG. 16b, the glass substrate 1800 is made of a light transmissive material to transmit incident light, with the plurality of reflecting plates 1801a to 1801c arranged on a surface of the glass substrate 1800 to be spaced apart from each other at regular intervals. In this case, the reflecting plates 1801a to 1801d may be arranged perpendicular to the longitudinal direction of the thin-film piezoelectric micromirrors 1814a to 1814d.

Figure 17A:
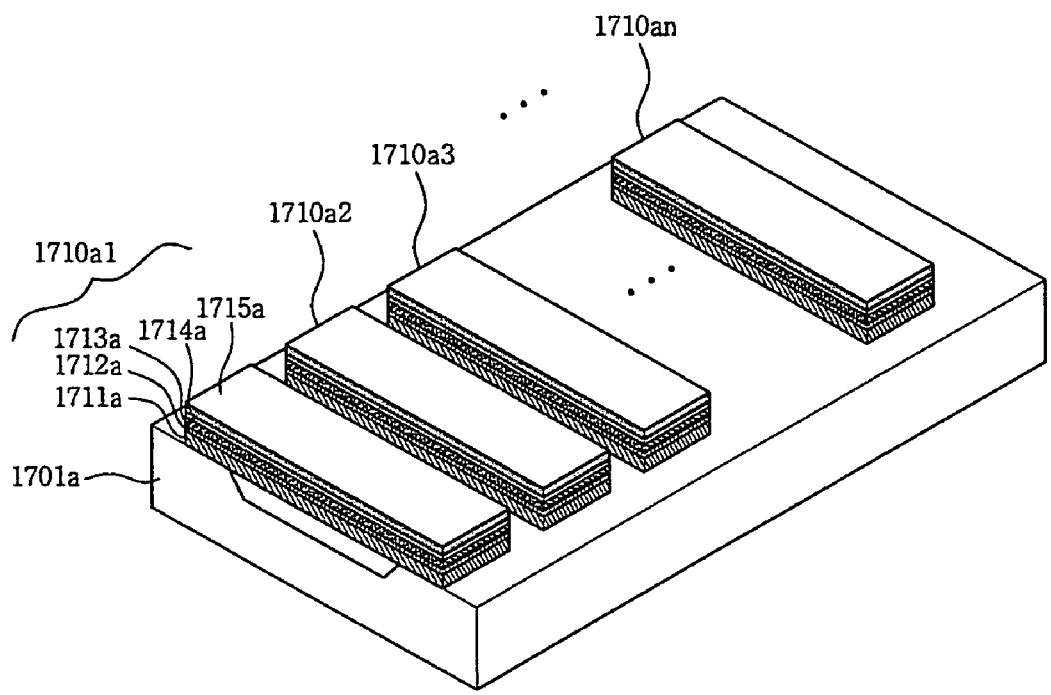
Figure 17B:
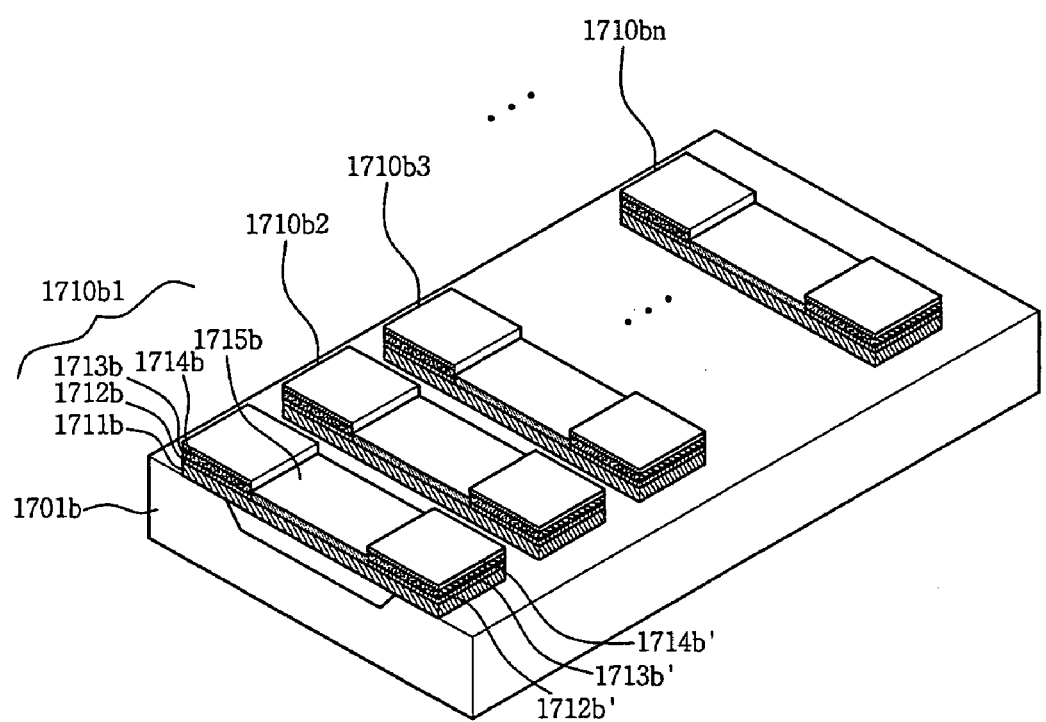
Figure 17C:
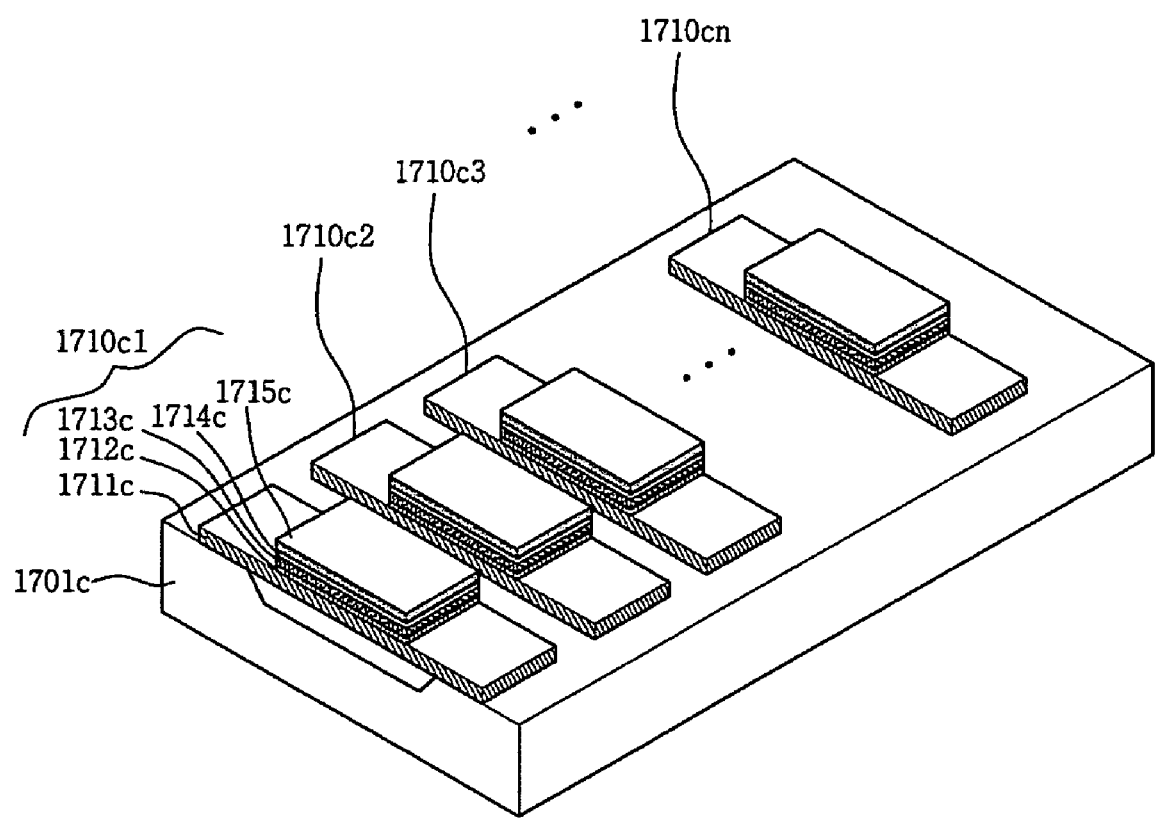

FIGS. 17a to 17c are perspective views to show three thin-film piezoelectric micromirror arrays used in the variable grating diffractive light modulators of FIGS. 13, 14a, 15, and 16a.

FIG. 17a is a perspective view to show an example of the thin-film piezoelectric micromirror arrays used in FIGS. 13, 14a, 15, and 16a.

Referring to the drawing, the thin-film piezoelectric micromirror array includes a silicon substrate 1701a and a plurality of elements 1710a1 to 1710an.

The silicon substrate 1701a has a recess to provide an air space to the elements 1710a1 to 1710an. Both ends of each of the elements 1710a1 to 1710an are attached to opposite sides of the recess.

Each of the elements 1710a1 to 1710an has a shape of a bar. Lower surfaces of both ends of each of the elements 1710a1 to 1710an are attached to opposite sides of the recess of the silicon substrate 1701a such that a central portion of each of the elements 1710a1 to 1710an is positioned above the recess of the silicon substrate 1701a. A micromirror layer 1715a is laminated on an upper portion of each of the elements 1710a1 to 1710an. Further, each of the elements 1710a1 to 1710an includes a lower supporter 1711a. In this case, a portion of the lower supporter 1711a located above the recess is vertically movable.

Further, each of the elements 1710a1 to 1710an includes a lower electrode layer 1712a, a piezoelectric material layer 1713a, an upper electrode layer 1714a, and a micromirror layer 1715a. The lower electrode layer 1712a is laminated on the lower supporter 1711a to provide a piezoelectric voltage. The piezoelectric material layer 1713a is laminated on the lower electrode layer 1712a, and contracts or expands to generate a vertical actuating force when voltage is applied to both surfaces of the piezoelectric material layer 1713a. The upper electrode layer 1714a is laminated on the piezoelectric material layer 1713a, and provides a piezoelectric voltage to the piezoelectric material layer 1713a. The micromirror layer 1715a is laminated on the upper electrode layer 1714a, and reflects incident beams, thus diffracting the incident beams.

FIG. 17b is a perspective view to show another example of the thin-film piezoelectric micromirror arrays used in FIGS. 13, 14a, 15, and 16a.

Referring to FIG. 17b, the thin-film piezoelectric micromirror array of FIG. 17b is different from that of FIG. 17a in that piezoelectric layers are provided on both sides of each element.

As shown in the drawing, the thin-film piezoelectric micromirror array includes a silicon substrate 1701b and a plurality of elements 1710b1 to 1710bn.

The silicon substrate 1701b has a recess to provide an air space to the elements 1710b1 to 1710bn. Both ends of each of the elements 1710b1 to 1710bn are attached to opposite sides of the recess.

Each of the elements 1710b1 to 1710bn has a shape of a bar. Lower surfaces of both ends of each of the elements 1710b1 to 1710bn are attached to opposite sides of the recess of the silicon substrate 1701b such that a central portion of each of the elements 1710b1 to 1710bn is positioned above the recess of the silicon substrate 1701b. Further, each of the elements 1710b1 to 1710bn includes a lower supporter 1711b. In this case, a portion of the lower supporter 1711b located above the recess is vertically movable.

Each of the elements 1710b1 to 1710bn includes a first lower electrode layer 1712b, a first piezoelectric material layer 1713b, and a first upper electrode layer 1714b. The first lower electrode layer 1712b is laminated on a left end of the lower supporter 1711b to provide a piezoelectric voltage. The first piezoelectric material layer 1713b is laminated on the first lower electrode layer 1712b, and contracts or expands to generate a vertical actuating force, when voltage is applied to both surfaces of the first piezoelectric material layer 1713b. The first upper electrode layer 1714b is laminated on the first piezoelectric material layer 1713b, and provides a piezoelectric voltage to the first piezoelectric material layer 1713b.

Further, each of the elements 1710b1 to 1710bn includes a second lower electrode layer 1712b', a second piezoelectric material layer 1713b', and a second upper electrode layer 1714b'. The second lower electrode layer 1712b' is laminated on a right end of the lower supporter 1711b to provide a piezoelectric voltage. The second piezoelectric material layer 1713b' is laminated on the second lower electrode layer 1712b', and contracts or expands to generate a vertical actuating force, when voltage is applied to both surfaces of the second piezoelectric material layer 1713b'. The second upper electrode layer 1714b' is laminated on the second piezoelectric material layer 1713b', and provides a piezoelectric voltage to the second piezoelectric material layer 1713b'.

FIG. 17c is a perspective view to show a further example of the thin-film piezoelectric micromirror arrays used in FIGS. 13, 14a, 15, and 16a.

Referring to FIG. 17c, the thin-film piezoelectric micromirror array of FIG. 17c is different from those of FIG. 17a and 17b in that piezoelectric layers are provided at a center of each element.

The thin-film piezoelectric micromirror array includes a silicon substrate 1701c and a plurality of elements 1710c1 to 1710cn. The silicon substrate 1701c has a recess to provide an air space to the elements 1710c1 to 1710cn. Both ends of each of the elements 1710c1 to 1710cn are attached to opposite sides of the recess.

Each of the elements 1710c1 to 1710cn has a shape of a bar. Lower surfaces of both ends of each of the elements 1710c1 to 1710cn are attached to opposite sides of the recess of the silicon substrate 1701c such that a central portion of each of the elements 1710c1 to 1710cn is positioned above the recess of the silicon substrate 1701c. Further, a micromirror layer 1715c is laminated on a portion above the recess (a portion of the micromirror layer 1715c placed outside the recess is etched and eliminated). Further, each of the elements 1710c1 to 1710cn includes a lower supporter 1711c. In this case, a portion of the lower supporter 1711c located above the recess is movable up and down.

Further, each of the elements 1710c1 to 1710cn includes a lower electrode layer 1712c, a piezoelectric material layer 1713c, an upper electrode layer 1714c, and the micromirror layer 1715c. The lower electrode layer 1712c is laminated on the lower supporter 1711c to be located above the recess, and provides a piezoelectric voltage. The piezoelectric material layer 1713c is laminated on the lower electrode layer 1712c, and contracts or expands to generate a vertical actuating force, when voltage is applied to both surfaces of the piezoelectric material layer 1713c. The upper electrode layer 1714c is laminated on the piezoelectric material layer 1713c, and provides a piezoelectric voltage to the piezoelectric material layer 1713c. The micromirror layer 1715c is laminated on the upper electrode layer 1714c, and reflects incident beams, thus diffracting the incident beams.

As an example of the present invention, the recessed-type thin-film piezoelectric micromirror array having a recess on a substrate has been described herein. However, a raised-type thin-film piezoelectric micromirror array without the recess on the substrate is possible, as long as a central portion of the thin-film micromirror is spaced apart from the upper surface of the substrate by a predetermined distance to provide an air space.

As described above, the present invention allows a large tolerance for a gap during operation when a width of an upper grating is larger than the gap between micromirrors, and prevents the capacity of a copper-foil of a light modulator from deteriorating, even though a reflective surface around an edge of the gap is rough due to operation.

Further, the present invention prevents diffraction efficiency from being reduced due to a gap between micromirrors.

The present invention allows an upper static grating to have a very small pitch, thus allowing several sub-pixels to be included in one pixel, thereby enhancing image contrast.

Further, the present invention forms one pixel with a single micro actuator, so that the uniformity of beams in the pixel or between the pixels is increased, compared to the conventional method.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A variable grating diffractive light modulator, comprising:
   a light transmissive plate to transmit light;
   a plurality of first reflecting plates attached to a lower surface of the light transmissive plate to be arranged in a row, each of the first reflecting plates having a first reflective surface on a light transmissive plate contact surface thereof;
   a plurality of second reflecting plates provided under the first reflecting plates to be spaced apart from the first reflecting plates at a predetermined interval while being arranged in a row, each of the second reflecting plates having a second reflective surface to reflect incident light falling downwardly; and
   a plurality of actuating units acting on the second reflecting plates, and moving between a first position wherein the first reflective surfaces and the second reflective surfaces form a plane mirror, and a second position wherein the first and second reflective surfaces diffract the incident light, the actuating units comprising piezoelectric material, the piezoelectric material disposed on electrodes, so that the actuating unit shrinks or expands when voltage is applied to the electrodes.

2. The variable grating diffractive light modulator according to claim 1, wherein the first reflecting plates are parallel to the second reflecting plates.

3. The variable grating diffractive light modulator according to claim 1, wherein the first and second reflecting plates cross each other.

4. The variable grating diffractive light modulator according to claim 2, wherein the light transmissive plate is arranged such that parts of the lower surface thereof free from the first reflecting plates are located above the second reflecting plates.

5. A variable grating diffractive light modulator according to claim 1, wherein one electrode of the actuating unit is incorporated in the second reflecting plates.

6. A variable grating diffractive light modulator, comprising:
   a light transmissive substrate to transmit light;
   a plurality of first reflecting plates attached to the light transmissive substrate and arranged in a row, each of the first reflecting plates having a first reflective surface facing the light transmissive substrate;
   a plurality of second reflecting plates spaced apart from the first reflecting plates at a predetermined interval and arranged in a row, each of the second reflecting plates having a second reflective surface facing the light transmissive substrate to reflect incident light falling downwardly; and
   a plurality of actuating units acting on the second reflecting plates to move the second plates between a first position wherein the first reflective surfaces and the second reflective surfaces form a plane mirror, and a second position wherein the first and second reflective surfaces diffract the incident light, the actuating units comprising piezoelectric material disposed between first and second electrodes, wherein one of the first and second electrodes comprising the second reflecting plates.

7. The variable grating diffractive light modulator according to claim 6, wherein the first reflecting plates are disposed in parallel relationship to the second reflecting plates.

8. The variable grating diffractive light modulator according to claim 6, wherein the first and second reflecting plates are disposed cross-wise to each other.

9. The variable grating diffractive light modulator according to claim 6, wherein portions of the second reflecting plates are in aligned face-to-face relationship with the first reflecting plates, and other portions of the second reflective plates are in aligned face-to-face relationship with the light transmissive substrate.

* * * * *